United States Patent [19]
Chuang et al.

[11] Patent Number: 5,642,794
[45] Date of Patent: Jul. 1, 1997

[54] RATCHET MECHANISM

[76] Inventors: Cheng-Hsung Chuang; Chen-Niu Huang; Mu-Tung Lai; Jui-Feng Chang, all of P.O. Box 63-99, Taichung, Taiwan

[21] Appl. No.: 613,018

[22] Filed: Mar. 11, 1996

[51] Int. Cl.⁶ .......................... B25B 23/00; F16D 41/18
[52] U.S. Cl. .................. 192/43; 74/575; 81/63.1; 192/43.2
[58] Field of Search .............. 192/43, 43.2; 74/575, 74/578; 81/60, 63.1

[56] References Cited

U.S. PATENT DOCUMENTS

| | | | |
|---|---|---|---|
| 300,771 | 6/1884 | Fray | 192/43.2 X |
| 1,157,427 | 10/1915 | Seivert | 81/60 |
| 2,333,549 | 11/1943 | Novak | 192/43.2 |
| 2,486,043 | 10/1949 | Lofgren | 74/575 |
| 2,649,176 | 8/1953 | Winger | 192/43 |
| 4,355,931 | 10/1982 | Leuenberger | 192/43.2 X |
| 4,696,208 | 9/1987 | Lay | 81/63.1 X |
| 4,777,852 | 10/1988 | Herman et al. | 81/63.1 |
| 4,793,222 | 12/1988 | Beugelsdyk | 192/43.2 X |
| 5,063,797 | 11/1991 | Huang | 81/60 |
| 5,379,873 | 1/1995 | Shiao | 192/43 |

*Primary Examiner*—Andrea L. Pitts

[57] ABSTRACT

A ratchet mechanism includes a rod having a gear and rotatably received in a barrel which has a slot. A slide is slidably engaged in the slot and has two ratchet teeth for engaging with the gear. A pusher is engaged on the slide and has a knob. A spring may bias the ratchet teeth to engage with the gear. A sleeve is engaged on the barrel and has a groove aligned with the slot. The ratchet teeth may be engaged with the gear separately or simultaneously in order to control the rotational directions of the rod and the gear.

5 Claims, 3 Drawing Sheets

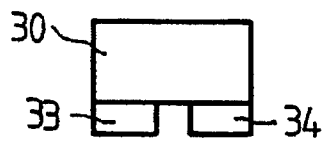
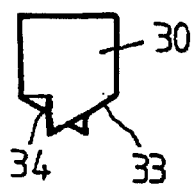
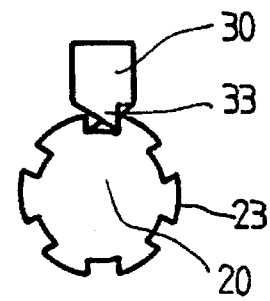
FIG.5  FIG.6  FIG.7
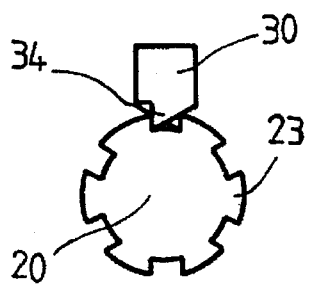
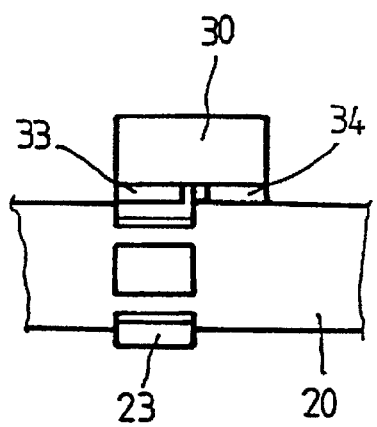
FIG.8  FIG.9
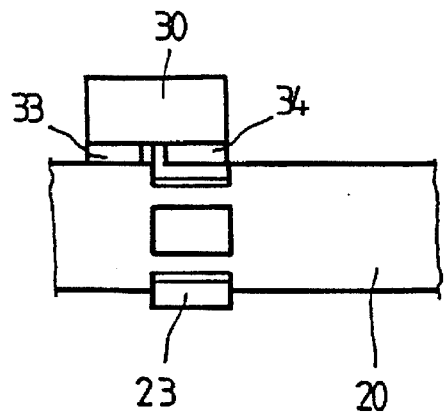
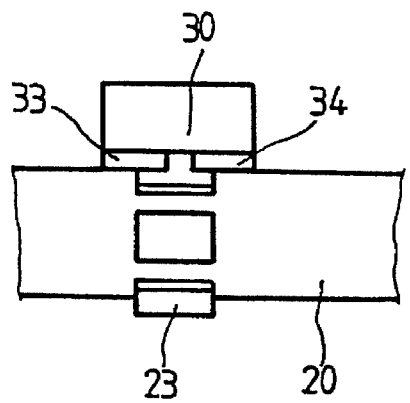
FIG.10  FIG.11

1

RATCHET MECHANISM

BACKGROUND OF THE INVENTION

1. Field of the Invention

The present invention relates to a ratchet mechanism, and more particularly to a ratchet screw driver and a ratchet wrench.

2. Description of the Prior Art

A typical ratchet mechanism is disclosed in U.S. Pat. No. 2,485,043 to Lofgren and includes a blade spring engaged with a ratchet wheel. However, the blade spring is weak such that the strength of the ratchet mechanism is bad. Another typical ratchet screw driver is disclosed in U.S. Pat. No. 4,777,852 to Herman et al., and includes an actuator that may not be swiftly operated. A further typical ratchet mechanism is disclosed in U.S. Pat. No. 5,053,797 to Huang and includes a plate member or a knob that may not be easily rotated by the users.

The present invention has arisen to mitigate and/or obviate the afore-described disadvantages of the conventional ratchet mechanisms.

SUMMARY OF THE INVENTION

The primary objective of the present invention is to provide a ratchet mechanism that may be easily operated by the user and that includes a greatly increased strength.

In accordance with one aspect of the invention, there is provided a ratchet mechanism comprising a barrel including a bore formed therein and including a slot formed therein and communicating with the bore, a rod rotatably received in the bore and including a gear formed thereon, a slide slidably engaged in the slot and and including a first and a second ratchet teeth arranged in an opposite manner for engaging with the gear, a pusher including a depression formed therein for engaging with the slide so as to move the slide along the slot and including a knob extended upward therefrom, a biasing means engaged between the pusher and the slide for biasing the ratchet teeth to engage with the gear, a sleeve engaged on the barrel and including a groove formed therein for aligning with the slot of the barrel and for engaging with the knob so as to allow the knob to be extended outward of the sleeve, the groove including a first end, a middle portion and a second end, the sleeve being engaged with the pusher for retaining the pusher in the slot, and means for securing the sleeve to the barrel. The first ratchet tooth is caused to engage with the gear in order to allow the rod and the gear to rotate in an active direction when the knob is moved to the first end of the groove, the second ratchet tooth is caused to engage with the gear in order to allow the rod and the gear to rotate in a reverse direction when the knob is moved to the second end of the groove, and the first and the second ratchet teeth are caused to engage with the gear simultaneously in order to lock the rod when the slide is pushed to the middle portion of the groove.

The securing means includes a stop formed on the barrel and a screw hole formed in the barrel, the sleeve includes a notch for engaging with the stop and includes an aperture for aligning with the screw hole, and a screw engaged through the aperture and engaged with the screw hole so as to secure the sleeve to the barrel.

The rod includes an annular recess formed therein for engaging with the screw so as to allow the rod to rotate relative to the barrel and so as to prevent the rod from disengaging front the barrel.

The sleeve includes two pairs of protrusions extended inward of the groove so as to define three retaining positions for retaining the knob in the first end, the middle portion and the second end of the groove respectively.

The slide includes a shoulder formed therein, the pusher includes a pair of flanges for engaging with the shoulder of the slide so as to stably retain the slide in the pusher.

Further objectives and advantages of the present invention will become apparent from a careful reading of a detailed description provided hereinbelow, with appropriate reference to accompanying drawings.

BRIEF DESCRIPTION OF THE DRAWINGS

FIG. 5 is a front view of a slide;

FIG. 6 is an end view of the slide;

FIGS. 7 and 8 are end views illustrating the engagement of the slide with the gear; and FIGS. 9, 10, 11 are partial plane views illustrating the engagement of the slide with the gear.

DETAILED DESCRIPTION OF THE PREFERRED EMBODIMENT

Figure 1:
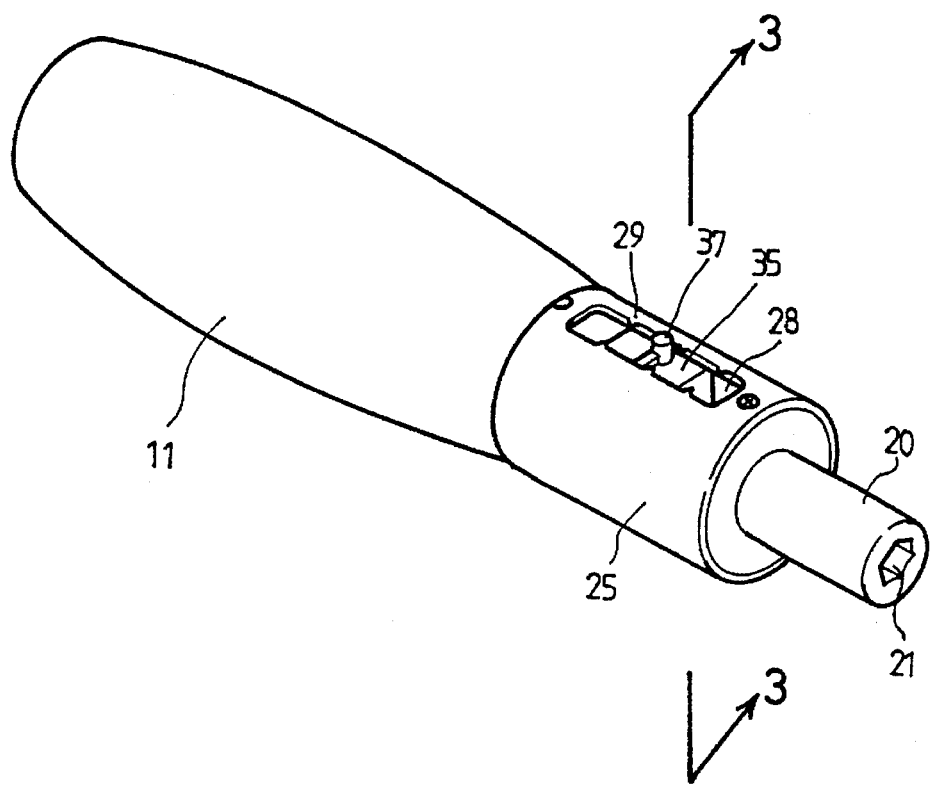
FIG. 1 is a perspective view of a ratchet mechanism in accordance with the present invention.
Figure 3:
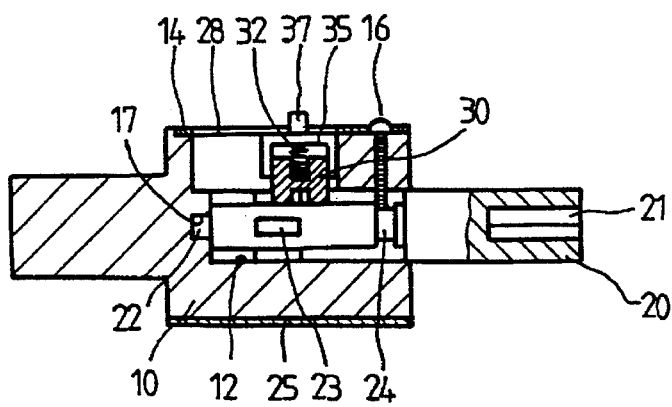
FIG. 3 is a cross sectional view taken alone lines 3—3 of FIG. 1.
Figure 2:
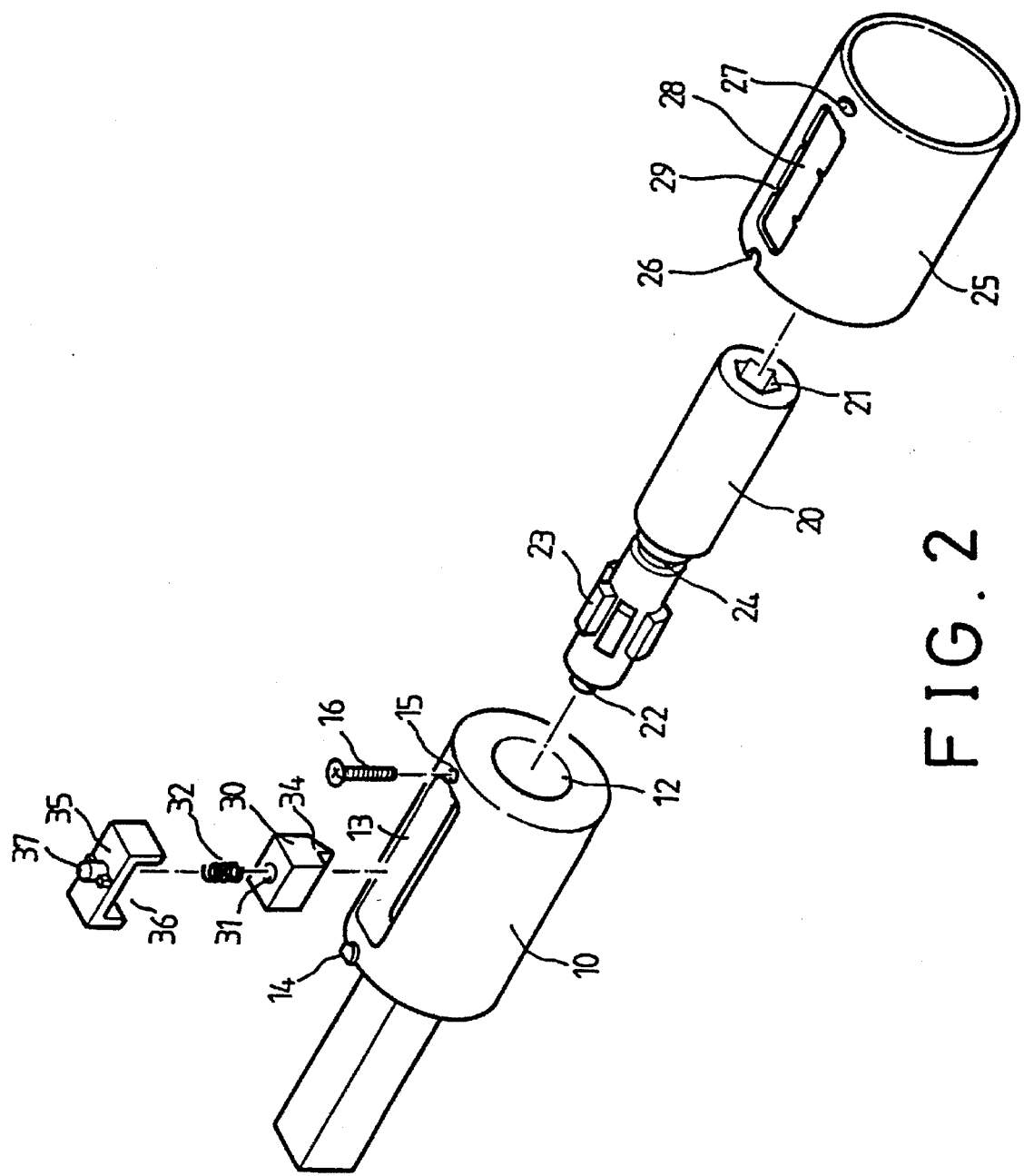
FIG. 2 is an exploded view of the ratchet mechanism.

Referring to the drawings, and initially to FIGS. 1 to 3, a ratchet mechanism in accordance with the present invention comprises a barrel 10 including a bore 12 formed therein for rotatably receiving a rod 20 therein and including a handle 44 secured to one end thereof. The barrel 40 includes a slot 13 formed therein and communicating with the bore 12, and includes a stop 14 and a screw hole 15 formed beside the end portions of the slot 13 respectively. A screw 16 is engaged with the screw hole 15. The barrel 10 includes a cavity 17 (FIG. 3) formed therein for engaging with a projection 22 of the rod 20 so as to stably and rotatably support the rod 20 therein. The rod 20 includes a gear 23 formed thereon and reachable from the slot 13, and includes an annular recess 24 formed in the middle portion thereof for engaging with the screw 16 such that the rod 20 is allowed to rotate relative to the barrel 10 only and is prevented from disengaging from the barrel 10. The rod 20 includes an engaging hole 21 formed therein for engaging with a screw or a nut. Alternatively, the rod 20 may include a screw driver bit formed thereon for driving screws and nuts.

A slide 30 is slidably engaged in the slot 13 and includes an orifice 31 formed in the upper portion for engaging with a spring 32 and includes two separated ratchet teeth 33, 34 arranged in an opposite manner, best shown in FIGS. 5 and 6, for engaging with said gear 23. A pusher 35 includes a depression 36 formed therein for engaging with the slide 30 so as to move the slide 30 along the slot 13. The spring 32 may bias the ratchet teeth 33, 34 to engage with the gear 23. The pusher 35 includes a knob 37 extended upward therefrom. A sleeve 25 is engaged on the barrel 10 and includes a notch 26 formed in one end for engaging with the stop 14 and includes an aperture 27 for engaging with the screw 16 such that the screw 16 may secure the sleeve 25 to the barrel 10. The sleeve 25 includes a groove 28 formed therein for aligning with the slot 13 of the barrel 10 and for engaging with the knob 37. The groove 28 has a size slightly smaller than the width of the pusher 35 so as to retain the pusher 35 within the slot 13. The sleeve 25 includes two pairs of protrusions 29 extended inward of the groove 28 so as to define three retaining positions for retaining the knob 37 such that the knob 37 may be retained in a front position, a middle position and a rear position.

Figure 4:
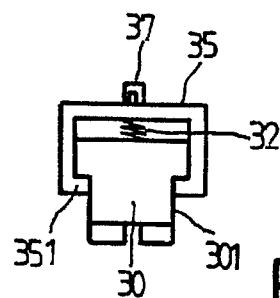
FIG. 4 is a partial cross sectional view illustrating the other application of the pusher.

Referring next to FIG. 4, the pusher 35 may include a pair of flanges 351 for engaging with a shoulder 301 of the slide 30 so as to stably retain the slide 30 therein.

In operation, as shown in FIGS. 7 and 9, when the slide 30 is pushed forward by the knob 37, the tooth 33 is caused to engage with the gear 23 such that the rod 20 and the gear 23 are allowed to rotate clockwise and are prevented from rotating counterclockwise, as viewing from FIG. 7. On the contrary, as shown in FIGS. 8 and 10, when the slide 30 is pushed rearward in order to engage the tooth 34 with the gear 23, the rod 20 and the gear 23 are allowed to rotate counterclockwise and are prevented from rotating clockwise, as viewing from FIG. 8. As shown in FIG. 11, when the slide 30 is moved to the middle portion, both the teeth 33, 34 are engaged with the gear 23 simultaneously such that the rod 20 and the gear 23 are locked and may not be rotated relative to the barrel 10.

It is to be noted that, as best shown in FIGS. 7 and 8, the teeth 33, 34 are in plane engagement with the gear 23 such that the engagement between the teeth 33, 34 and the gear 23 is solid and forceful. In addition, the slide 30 may be effectively moved by the pusher 35.

Accordingly, the ratchet mechanism in accordance with the present invention includes a slide having two ratchet teeth that may be caused to engage with the gear respectively or simultaneously such that the ratchet mechanism may be easily operated by the user and may include a greatly increased strength.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A ratchet mechanism comprising:

a barrel including a bore formed therein and including a slot formed therein and communicating with said bore, a rod rotatably received in said bore and including a gear formed thereon, a slide slidably engaged in said slot and including a first and a second ratchet teeth arranged in an opposite manner for engaging with said gear, a pusher including a depression formed therein for engaging with said slide so as to move said slide along said slot and including a knob extended upward therefrom, a biasing means engaged between said pusher and said slide for biasing said ratchet teeth to engage with said gear, a sleeve engaged on said barrel and including a groove formed therein for aligning with said slot of said barrel and for engaging with said knob so as to allow said knob to be extended outward of said sleeve, said groove including a first end, a middle portion and a second end, said sleeve being engaged with said pusher for retaining said pusher in said slot, and means for securing said sleeve to said barrel, said first ratchet tooth being caused to engage with said gear in order to allow said rod and said gear to rotate in an active direction when said knob is moved to said first end of said groove, said second ratchet tooth being caused to engage with said gear in order to allow said rod and said gear to rotate in a reverse direction when said knob is moved to said second end of said groove, and said first and said second ratchet teeth being caused to engage with said gear simultaneously in order to lock said rod when said slide is pushed to said middle portion of said groove.

2. A ratchet mechanism according to claim 1, wherein said securing means includes a stop formed on said barrel and a screw hole formed in said barrel, said sleeve includes a notch for engaging with said stop and includes an aperture for aligning with said screw hole, and a screw engaged through said aperture and engaged with said screw hole so as to secure said sleeve to said barrel.

3. A ratchet mechanism according to claim 2, wherein said rod includes an annular recess formed therein for engaging with said screw so as to allow said rod to rotate relative to said barrel and so as to prevent said rod from disengaging from said barrel.

4. A ratchet mechanism according to claim 1, wherein said sleeve includes two pairs of protrusions extended inward of said groove so as to define three retaining positions for retaining said knob in said first end, said middle portion and said second end of said groove respectively.

5. A ratchet mechanism according to claim 1, wherein said slide includes a shoulder formed therein, said pusher includes a pair of flanges for engaging with said shoulder of said slide so as to stably retain said slide in said pusher.

* * * * *